United States Patent [19]

Doorakian et al.

[11] Patent Number: 4,496,709

[45] Date of Patent: Jan. 29, 1985

[54] PROCESS FOR PREPARING EPOXY RESINS EMPLOYING A PHOSPHONIUM TRIFLUOROACETATE CATALYST

[75] Inventors: George A. Doorakian, Bedford; Marsha A. Paul, Natick, both of Mass.; Adolphus V. Gist, Dallas, Tex.

[73] Assignee: The Dow Chemical Company, Midland, Mich.

[21] Appl. No.: 504,918

[22] Filed: Jun. 16, 1983

Related U.S. Application Data

[63] Continuation-in-part of Ser. No. 391,094, Jun. 23, 1982, abandoned.

[51] Int. Cl.$^3$ ............................................. C08G 59/68
[52] U.S. Cl. ........................................ 528/89; 528/99; 528/101; 528/102; 528/104
[58] Field of Search .................... 528/89, 99, 101, 102, 528/104

[56] References Cited

U.S. PATENT DOCUMENTS

| | | | |
|---|---|---|---|
| 2,910,455 | 10/1959 | Christenson et al. | 528/101 |
| 3,306,872 | 2/1967 | Maycock et al. | 260/32.8 |
| 3,477,990 | 11/1969 | Dante et al. | 528/101 X |
| 3,477,994 | 11/1969 | Schweitzer et al. | 260/67 |
| 3,480,471 | 11/1969 | Rembold | 117/161 |
| 3,679,465 | 7/1972 | Flynn | 117/126 |
| 3,687,894 | 9/1972 | Collings et al. | 260/47 |
| 3,738,862 | 6/1973 | Klarquist et al. | 117/126 |
| 3,948,855 | 4/1976 | Perry | 260/47 |
| 3,998,983 | 12/1976 | Smith | 427/374 |
| 4,075,260 | 2/1978 | Tsen et al. | 260/830 |
| 4,093,650 | 6/1978 | Doorakian et al. | 260/539 |
| 4,132,706 | 1/1979 | Doorakian et al. | 528/89 |
| 4,168,331 | 9/1979 | Davis | 427/58 |
| 4,171,420 | 10/1979 | Doorakian et al. | 528/89 |
| 4,177,216 | 12/1979 | Doorakian et al. | 260/606.5 |
| 4,251,595 | 2/1981 | Dumesnil et al. | 428/426 |
| 4,352,918 | 10/1982 | Whiteside et al. | 528/89 |
| 4,354,015 | 10/1982 | Doorakian et al. | 528/89 |
| 4,366,295 | 12/1982 | Tyler et al. | 528/89 X |

FOREIGN PATENT DOCUMENTS

| | | | |
|---|---|---|---|
| 893191 | 2/1972 | Canada | 260/47 |
| 1434889 | 5/1976 | United Kingdom | 260/47 |

*Primary Examiner*—Earl A. Nielsen
*Attorney, Agent, or Firm*—J. G. Carter

[57] ABSTRACT

Epoxy resins having improved properties are prepared by reacting an epoxy resin with a dihydric phenol in the presence of a sufficient quantity of a phosphonium trifluoroacetate catalyst such that the product resulting from reacting a mixture of the catalyst, epoxy resin and dihydric phenol has a % epoxide difference from the theoretical percent epoxide of from about 0.5 to about 4.0.

12 Claims, No Drawings

PROCESS FOR PREPARING EPOXY RESINS EMPLOYING A PHOSPHONIUM TRIFLUOROACETATE CATALYST

CROSS REFERENCE TO RELATED APPLICATION

This is a continuation-in-part of application Ser. No. 391,094 filed June 23, 1982 abandoned.

BACKGROUND OF THE INVENTION

Epoxy resins have heretofore been advanced in the presence of phosphonium catalysts disclosed by Dante in U.S. Pat. No. 3,477,990 and Perry in Canadian Pat. No. 893,191 and U.S. Pat. No. 3,948,855. However, the quantities of catalyst employed were that which would provide a resin having a percent epoxide value sufficiently close to the theoretical epoxide value that no improvement in properties were envisioned.

An allowed application Ser. No. 212,959 filed Dec. 4, 1980, now U.S. Pat. No. 4,352,918 by Whiteside, Gist and Doorakian, disclosed the preparation of advanced epoxy resins having improved physical properties by employing a sufficient quantity of a phosphonium catalyst such that the resultant advanced epoxy resin has a percent epoxide value lower than the theoretical percent epoxide value.

The process of the present invention provides a method for preparing advanced epoxy resins having a percent epoxide value lower than the theoretical percent epoxide and a desirably lower color than the color provided by those advanced epoxy resins produced by the process described in the aforementioned allowed application Ser. No. 212,959.

SUMMARY OF THE INVENTION

The present invention pertains to an improvement in a process for advancing epoxy resins in molecular weight by reacting (A) an epoxy resin which is a glycidyl ether of a dihydric phenol or thiophenol having an average of more than one glycidyl ether group per molecule with (B) a dihydric phenolic or thiophenolic compound in the presence of (C) a phosphonium catalyst wherein the improvement comprises employing as a catalyst, component (C), phosphonium trifluoroacetate salt.

The present invention also pertains to products resulting from curing a mixture of an epoxy resin prepared by the above procedure and a curing quantity of a curing agent therefor.

The present invention also pertains to an improvement in a process for preparing resin impregnated substrates for use in preparing electrical laminates by a process which comprises:

(I) saturating said substrate with a resin forming mixture comprising;
  (A) an epoxy resin having an epoxide equivalent weight of from about 300 to about 600, preferably from about 375 to about 475 which has been prepared by reacting
    (1) a glycidyl ether of a dihydric phenol or thiophenol having an average of more than one epoxide group per molecule and an epoxide equivalent weight (EEW) of from about 156 to about 400, preferably from about 177 to about 190, with
    (2) a dihydric phenolic or thiophenolic compound in the presence of
    (3) a phosphonium catalyst for effecting the reaction between (1) and (2), wherein components (1) and (2) are employed in quantities which will provide a theoretical percent epoxide of the reaction product of from about 8 to about 15, preferably from about 9.5 to about 13;
  (B) a curing agent for said epoxy resin and
  (C) a solvent system for Components A and B;
(II) heating the resultant impregnated substrate to B-stage the resin and remove the solvent system;
the improvement which comprises:

employing as the catalyst, Component (A-3), a phosphonium salt or complex thereof which has at least one, preferably two, most preferably three aromatic ring(s) attached to the phosphorus atom of the phosphonium group and at least one aliphatic hydrocarbon group attached to said phosphorus atom, said catalyst being employed in a quantity such that the epoxy resin which would result when subjecting a mixture of components (A-1), (A-2) and (A-3) to suitable reaction conditions produces an advanced epoxy resin wherein the difference obtained by subtracting the percent epoxide obtained by analysis from the theoretical percent epoxide is from about 0.5 to about 4, preferably from about 1 to about 2.

The present invention also pertains to novel epoxy resin compositions resulting from reacting a diglycidyl ether of 2,2'-diallyl bisphenol-A with 2,2'-diallyl bisphenol-A in the presence of a suitable catalyst therefor.

DETAILED DESCRIPTION OF THE PREFERRED EMBODIMENTS

Suitable glycidyl ethers of a dihydric phenol which can be employed in the present invention include those represented by the formula

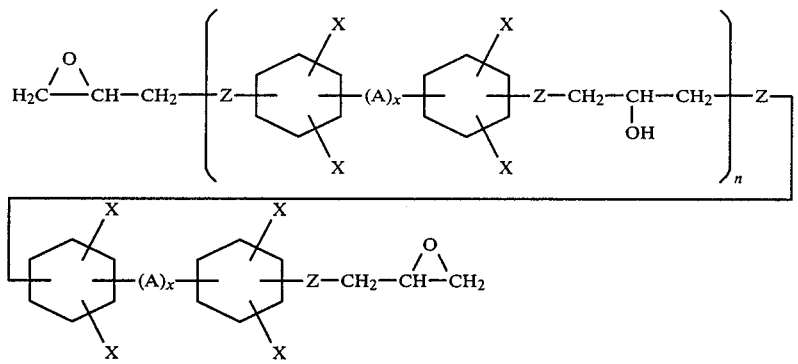

wherein A is a divalent hydrocarbon group having from 1 to about 8 carbon atoms,

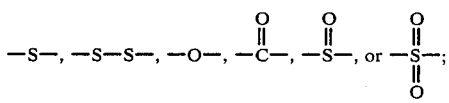

each X is independently hydrogen, chlorine, bromine or a hydrocarbon group having from 1 to about 10 carbon atoms; each Z is independently O or S; x has a value of zero or one and n has a value such that the EEW is from about 156 to about 400, preferably from about 177 to about 190, calculated on the basis of X being hydrogen.

Particularly suitable are the diglycidyl ethers of bisphenol A and tetrabromobisphenol A.

Suitable dihydric phenolic or thiophenolic compounds include, for example, catechol, hydroquinone, resorcinol and bisphenols such as those represented by the formula

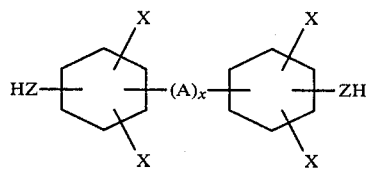

wherein A, X, Z and x are as defined above.

Particularly suitable dihydric phenolic compounds are bisphenol A and tetrabromo bisphenol A.

The phosphonium trifluoroacetate salt catalysts employed herein can be in essentially pure form or they can be prepared insitu without purification other than filtration of solid precipitated by-products of the reaction between a tetrahydrocarbyl phosphonium compound and trifluoroacetic acid or a salt thereof.

Suitable phosphonium compounds which can be employed herein include, for example, those compounds having at least one phosphonium cation group represented by the formula

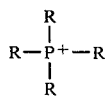

wherein each R is independently a hydrocarbyl or substituted hydrocarbyl group having from 1 to about 20, preferably from 1 to about 6, carbon atoms or substituted hydrocarbyl groups. It is preferred that at least one, preferably two and most preferably three, of the R groups be an aromatic group i.e., an aryl group or an alkaryl group such that the phosphorus atom is attached directly to the aromatic ring of such aryl or alkaryl group.

By the term hydrocarbyl, it is meant that the groups can be alkyl, aryl, alkaryl, aralkyl and the alkyl can be either cyclic or acyclic. By substituted hydrocarbyl it is meant that the hydrocarbyl groups can contain one or more substituent groups such as, for example, Cl, Br, I, $NO_2$, OH, SH, glycidyl ether, mixtures thereof and the like.

The R groups can contain any substituent group which will not deactivate the catalyst under the conditions in which they are employed.

It is preferred that the phosphonium cation contain at least one aromatic ring and at least one alkyl group attached directly to a phosphorous atom.

Suitable anions include the halides, such as, for example, Cl, Br, I, carboxylates, dicarboxylates, phosphates, nitrates, sulfates, nitrites, sulfites, borates, chromates, mixtures thereof and the like.

The dihydric phenol and the glycidyl ether of a dihydric phenol are employed in quantities such that the theoretical percent epoxide of the resultant product has the desired value.

The quantity of catalyst will of course vary depending upon the particular catalyst employed; however, for most catalysts, from about 0.1 to about 1.5, preferably from about 0.2 to about 0.8, parts catalyst by weight per 100 parts by weight of glycidyl ether of dihydric phenol can be employed.

The reaction conditions employed to prepare the advanced epoxy resins can vary, but temperatures of from about 100° C. to about 200° C., preferably from about 120° C. to about 160° C., are suitable. Lower temperatures usually require longer reaction times whereas higher temperatures usually require shorter reaction times.

The pressure employed is not particularly important and can be from about 1 mm Hg vacuum to about 100 psig. However, it is usually preferred to employ pressures of from about 5 psig to about 20 psig.

Any of the well known curing agents can be employed in the present invention to cure the epoxy resins. Such curing agents include amines, amides, guanidines, phenolic hydroxyl-containing materials, carboxylic acids, carboylic acid anhydrides, imidazoles, biguanides, mixtures thereof and the like.

Particularly suitable curing agents include, for example, guanidines such as for example, dicyandiamide and tetramethyl guanidine and biguanides such as 1,6-xylene biguanide, polyhydric phenols, mixtures thereof and the like.

The quantity of curing agent employed depends upon the particular curing agent employed and the properties desired in the resultant cured resin, all of which is well known by those persons reasonably skilled in the art and discussed in *HANDBOOK OF EPOXY RESINS*, by Lee and Neville, McGraw Hill, 1967, which is incorporated herein by reference.

The theoretical percent epoxide is calculated by the following formula $$\text{THEORETICAL \% EPOXIDE} = \frac{4300 \, (EqER - EqDHP)}{WtER + WtDHP}$$

EqER = epoxide equivalents from the epoxy resin.
EqDHP = phenolic hydroxyl equivalents from the dihydric phenol.
WtER = weight of epoxy resin employed.
WtDHP = weight of dihydric phenol employed.

The actual percent epoxide was determined experimentally by titration with perchloric acid in glacial acetic acid by the liberation of hydrogen bromide generated by the addition of tetraethylammonium bromide in glacial acetic acid using crystal violet as an indicator. The epoxy groups react stoichiometrically with hydrogen bromide generated from the reaction of perchloric acid with tetraethyl ammonium bromide. When the epoxy groups have been reacted, the free hydrogen bromide causes the crystal violet to change color.

The phosphonium trifluoroacetate salts employed as epoxy advancement catalysts in the examples (Table I) were prepared by the synthetic procedures described schematically below.

Procedure A

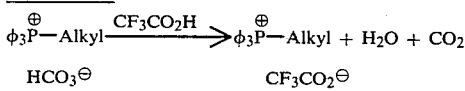

Procedure B

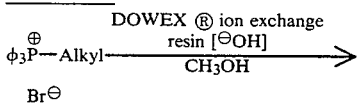

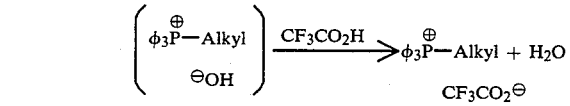

Procedure C

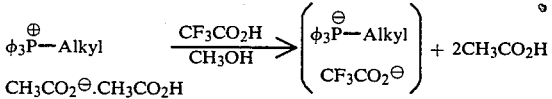

Procedure D

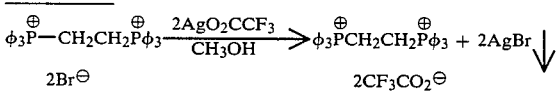

The procedure (A) described above was employed to prepare the catalyst employed in examples 1–5.

The procedure (B) described above was employed to prepare the catalyst employed in examples 6, 7, 8, 10, 11 and 12.

The procedure (C) described above was employed to prepare the catalyst employed in comparative experiments A and B and Example 4.

The procedure (D) described above was employed to prepare the catalyst employed in example 9.

GENERAL PROCEDURE FOR RESIN PREPARATION

To a reaction vessel equipped with a means of pressure regulation, stirring, temperature control and indication of nitrogen purge was charged the desired weight of the specified low molecular weight diglycidyl either of a dihydric phenol and the desired weight of the specified dihydric phenol or thiophenol. The mixture was heated at a rate of 5° C./minute (0.083° C./s) with a constant flow of N over the reactants, unless otherwise indicated. When the temperature of the mixture reached 60° C., the desired amount of the specified phosphonium salt dissolved in methanol was added. The mixture was heated at the desired reaction conditions (specified as A or B in Table I) to give the resultant product. The reaction condition (A) consists of heating the reaction mixture for one hour (3600 s) at the temperatures of 130° C., 140° C., 150° C. and finally at 160° C. for 2 hours (7200 s). The reaction (B) was heated directly to 150° C. with an exotherm occurring followed by post heating at 160° C. for 3 hours (10800 s).

REACTANTS FOR RESIN ADVANCEMENT

EPOXY RESIN A was a liquid diglycidyl ether of bisphenol-A having an average epoxide equivalent weight of 179.9, % epoxide of about 23.90.

EPOXY RESIN B was a liquid diglycidyl ether of bisphenol-A having an average epoxide equivalent weight of 188.6, % epoxide of about 22.8.

EPOXY RESIN C was a liquid diglycidyl ether of 2,2'-diallyl bisphenol-A having an average epoxide equivalent weight of 227.5, % epoxide of about 18.9.

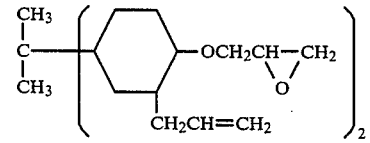

DIHYDRIC PHENOL or THIOPHENOL A was tetrabromobisphenol-A, a dihydric phenol, having a phenolic hydroxyl equivalent weight of about 272 and percent bromine content of about 58.85%.

DIHYDRIC PHENOL or THIOPHENOL B was bisphenol-A, a dihydric phenol, having a phenolic hydroxyl equivalent weight of about 114.

DIHYDRIC PHENOL or THIOPHENOL C was 2,2'diallyl bisphenol-A, a dihydric phenol, having a phenolic hydroxyl equivalent weight of about 155.

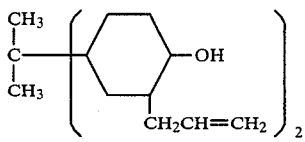

DIHYDRIC PHENOL or THIOPHENOL D was 4,4'-phenoxybenzene dithiol, a dihydric thiophenol, having a thiophenolic thiol equivalent weight of about 118.

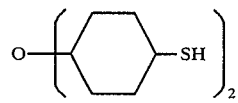

DIHYDRIC PHENOL or THIOPHENOL E was 4,4'sulfonyldiphenol, a dihydric phenol, having a phenolic hydroxyl equivalent weight of about 125.

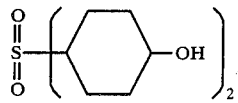

TABLE I

| EXAMPLE NUMBER OR COMP. EXPT. LETTER | CATALYST, phr | REACTANTS EPOXY RESIN type/grams/equiv | PHENOLIC OR THIO-PHENOLIC COMPOUND type/grams/equiv. |
|---|---|---|---|
| 1 | $\phi_3$,EtP$^\oplus$CF$_3$CO$_2^\ominus$, 0.8 | A/112.33/0.624 | B/38.8/0.340 |
| 2 | $\phi_3$,EtP$^\oplus$CF$_3$CO$_2^\ominus$, 0.43 | B/200/1.060 | A/82.8/0.304 |
| 3 | $\phi_3$,EtP$^\oplus$CF$_3$CO$_2^\ominus$, 0.43 | B/200/1.060 | A/82.8/0.304 |
| A* | $\phi_3$,EtP$^\oplus$CH$_2$CO$_2^\ominus$·CH$_3$CO$_2$H + HO$_2$CCO$_2$H, 0.42 | B/200/1.060 | A/82.8/0.304 |
| B* | $\phi_3$,EtP$^\oplus$CH$_2$CO$_2^\ominus$·CH$_3$CO$_2$H + HO$_2$CCO$_2$H, 0.42 | B/200/1.060 | A/82.8/0.304 |
| 4* | $\phi_3$,EtP$^\oplus$CH$_3$CO$_2^\ominus$·CH$_3$CO$_2$H + CF$_3$CO$_2$H, 0.42 | B/200/1.060 | A/82.8/0.304 |
| C | $\phi_3$,EtP$^\oplus$CH$_3$CO$_2^\ominus$·CH$_3$CO$_2$H, 0.4 | A/6/0.0334 | B/3.54/0.0311 |
| 5 | $\phi_3$,EtP$^\oplus$CF$_3$CO$_2^\ominus$, 0.5 | A/6/0.0334 | B/3.54/0.0311 |
| 6 | $\phi_3$,EtP$^\oplus$CF$_3$CO$_2^\ominus$, 0.4 | A/6/0.0334 | D/3.16/0.268 |
| 7 | $\phi_3$,n-BuP$^\oplus$CF$_3$CO$_2^\ominus$, 0.6 | C/6/0.0264 | B/1.12/0.0098 |
| 8 | $\phi_3$,MeP$^\oplus$CF$_3$CO$_2^\ominus$, 0.35 | C/6/0.0264 | C/2.27/0.0146 |
| 9 | $\phi_3$,CH$_3$(CH$_2$)$_{15}$$^\oplus$PCF$_3$CO$_2^\ominus$, 0.45 | C/6/0.0264 | A/2.75/0.0101 |
| 10 | $\phi_3$, $^\oplus$PCH$_2$CH$_2$P$^\oplus\phi_3$2CF$_3$CO$_2^\ominus$, 0.8 | A/6/0.0334 | A/3.23/0.0119 |
| D | $\phi_3$,EtP$^\oplus$ $^\ominus$O$_2$CCO$_2$H, 0.4 | A/6/0.0334 | A/3.23/0.0119 |
| 11 | 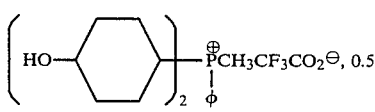, 0.5 | A/6/0.0334 | A/3.23/0.0119 |
| 12 | 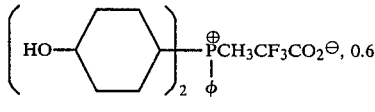, 0.6 | A/6/0.0334 | B/3.54/0.0311 |
| E | $\phi_3$,EtP$^\oplus$I$^\ominus$, 0.5 | A/6/0.0334 | B/3.54/0.0311 |
| F | $\phi_3$,EtP$^\oplus$Br$^\ominus$, 0.7 | A/6/0.0334 | A/3.23/0.0119 |
| G | $\phi_3$,MeP$^\oplus$I$^\ominus$, 0.8 | A/6/0.0334 | B/3.54/0.0311 |
| H | $\phi_3$,n-BuP$^\oplus$Br$^\ominus$, 0.6 | A/6/0.0334 | B/2/0.0175 |
| I | $\phi_3$,CH$_3$(CH$_2$)$_{15}$P$^\oplus$Br$^\ominus$, 0.4 | A/6/0.0334 | B/3.30/0.0289 |
| J | $\phi_3$, $^\oplus$PCH$_2$CH$_2$P$^\oplus\phi_3$2Br$^\ominus$, 0.8 | A/6/0.0334 | B/2/0.0175 |
| K | 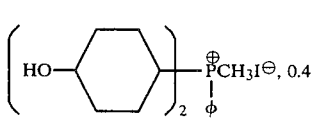, 0.4 | A/6/0.0334 | B/2/0.0175 |
| L | $\phi_3$,EtP$^\oplus$HCO$_2^\ominus$, 1.52 | A/112.19/0.624 | B/38.8/0.34 |
| M | $\phi_3$ETP$^\oplus$H$_2$PO$_4^\ominus$, 0.5 | A/6/0.0334 | A/3.23/0.0119 |
| N | 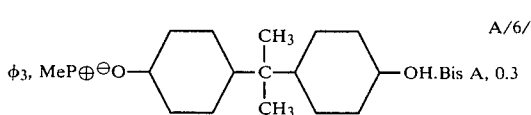.Bis A, 0.3 | A/6/0.0334 | B/2/0.0175 |
| 13* | $\phi_3$,n-BuP$^\oplus$Br$^\ominus$ + | C/6/0.0264 | B/1.12/0.00982 |

TABLE I-continued

CF₃CO₂H, 0.6

| EXAMPLE NUMBER OR COMP.EXPT. LETTER | CATALYST, phr | RXN CONDITIONS | ADVANCED RESIN PRODUCT % EPOXIDE | | GARDNER COLOR |
|---|---|---|---|---|---|
| | | | THEORY | EXPERIMENTAL | |
| 1 | $\phi_3\text{EtP}^\oplus\text{CF}_3\text{CO}_2^\ominus$, 0.8 | B | 8.0 | 6.1 | <1 |
| 2 | $\phi_3\text{EtP}^\oplus\text{CF}_3\text{CO}_2^\ominus$, 0.43 | A | 11.5 | 10.0 | 1 |
| 3 | $\phi_3\text{EtP}^\oplus\text{CF}_3\text{CO}_2^\ominus$, 0.43 | A w/air atm | 11.5 | 10.0 | 1 |
| A* | $\phi_3\text{EtP}^\oplus\text{CH}_2\text{CO}_2^\ominus\cdot\text{CH}_3\text{CO}_2\text{H}$ + $\text{HO}_2\text{CCO}_2\text{H}$, 0.42 | A | 11.5 | 10.0 | 2 |
| B* | $\phi_3\text{EtP}^\oplus\text{CH}_2\text{CO}_2^\ominus\cdot\text{CH}_3\text{CO}_2\text{H}$ + $\text{HO}_2\text{CCO}_2\text{H}$, 0.42 | A w/air atm | 11.5 | 10.0 | 4 |
| 4* | $\phi_3\text{EtP}^\oplus\text{CH}_3\text{CO}_2^\ominus\cdot\text{CH}_3\text{CO}_2\text{H}$ + $\text{CF}_3\text{CO}_2\text{H}$, 0.42 | A | 11.5 | 9.70 | 1 |
| C | $\phi_3\text{EtP}^\oplus\text{CH}_3\text{CO}_2^\ominus\cdot\text{CH}_3\text{CO}_2\text{H}$, 0.4 | A | 1.0 | 1.9 | 2 |
| 5 | $\phi_3\text{EtP}^\oplus\text{CF}_3\text{CO}_2^\ominus$, 0.5 | A | 1.0 | 0.0 | <1 |
| 6 | $\phi_3\text{EtP}^\oplus\text{CF}_3\text{CO}_2^\ominus$, 0.4 | B | 3.0 | 0.8 | <1 |
| 7 | $\phi_3\text{n-BuP}^\oplus\text{CF}_3\text{CO}_2^\ominus$, 0.6 | B | 10.0 | 7.3 | 1 |
| 8 | $\phi_3\text{MeP}^\oplus\text{CF}_3\text{CO}_2^\ominus$, 0.35 | B | 6.0 | 4.1 | 1 |
| 9 | $\phi_3\text{CH}_3(\text{CH}_2)_{15}\text{P}^\oplus\text{CF}_3\text{CO}_2^\ominus$, 0.45 | B | 8.0 | 5.9 | <1 |
| 10 | $\phi_3\overset{\oplus}{\text{P}}\text{CH}_2\text{CH}_2\overset{\oplus}{\text{P}}\phi_3 2\text{CF}_3\text{CO}_2^\ominus$, 0.8 | B | 10.0 | 7.6 | <1 |
| D | $\phi_3\text{EtP}^\oplus {}^\ominus\text{O}_2\text{CCO}_2\text{H}$, 0.4 | B | 10.0 | 8.7 | 3 |
| 11 | $\left(\text{HO}-\bigcirc-\right)_2 \overset{\oplus}{\text{P}}\text{CH}_3\text{CF}_3\text{CO}_2^\ominus$, 0.5 (with $\phi$) | B | 10.0 | 7.4 | <1 |
| 12 | $\left(\text{HO}-\bigcirc-\right)_2 \overset{\oplus}{\text{P}}\text{CH}_3\text{CF}_3\text{CO}_2^\ominus$, 0.6 (with $\phi$) | B | 1.0 | 0.0 | <1 |
| E | $\phi_3\text{EtP}^\oplus\text{I}^\ominus$, 0.5 | B | 1.0 | 2.1 | 3 |
| F | $\phi_3\text{EtP}^\oplus\text{Br}^\ominus$, 0.7 | B | 10.0 | 10.4 | 3 |
| G | $\phi_3\text{MeP}^\oplus\text{I}^\ominus$, 0.8 | B | 1.0 | 2.3 | 4 |
| H | $\phi_3\text{n-BuP}^\oplus\text{Br}^\ominus$, 0.6 | B | 8.0 | 8.2 | 3 |
| I | $\phi_3\text{CH}_3(\text{CH}_2)_{15}\text{P}^\oplus\text{Br}^\ominus$, 0.4 | B | 2.0 | 2.3 | 2 |
| J | $\phi_3, \overset{\oplus}{\text{P}}\text{CH}_2\text{CH}_2\overset{\oplus}{\text{P}}\phi_3 2\text{Br}^\ominus$, 0.8 | B | 8.0 | 7.8 | 4 |
| K | $\left(\text{HO}-\bigcirc-\right)_2 \overset{\oplus}{\text{P}}\text{CH}_3\text{I}^\ominus$, 0.4 (with $\phi$) | B | 8.0 | 8.1 | 3 |
| L | $\phi_3\text{EtP}^\oplus\text{HCO}_2^\ominus$, 1.52 | B | 8.0 | 6.4 | 5 |
| M | $\phi_3\text{ETP}^\oplus\text{H}_2\text{PO}_4^\ominus$, 0.5 | B | 10.0 | 9.4 | 2 |
| N | $\phi_3, \text{MeP}^\oplus {}^\ominus\text{O}-\bigcirc-\text{C}(\text{CH}_3)_2-\bigcirc-\text{OH}\cdot\text{Bis A}$, 0.3 | B | 8.0 | 8.0 | 2 |
| 13* | $\phi_3\text{n-BuP}^\oplus\text{Br}^\ominus$ + $\text{CF}_3\text{CO}_2\text{H}$, 0.6 | B | 10.0 | 7.5 | 1 |

*The two catalyst components were employed to prepare the catalyst insitu and were employed on a stoichiometric basis.

We claim:

1. In a process for advancing epoxy resins in molecular weight by reacting (A) an epoxy resin which is a glycidyl ether of a dihydric phenol having an average of more than one glycidyl ether group per molecule with (B) a dihydric phenolic or thiophenolic compound in the presence of catalytic quantities of (C) a phosphonium catalyst; the improvement which comprises employing as the catalyst, component (C), a phosphonium trifluoroacetate salt.

2. A process of claim 1 wherein component (A) is a glycidyl ether of bisphenol A having as average epoxide equivalent weight of from about 156 to about 400 and component (B) is bisphenol A.

3. A process of claim 2 wherein component (A) has an average epoxide equivalent weight of from about 177 to about 190.

4. A process of claims 1, 2 or 3 wherein the cation portion of said phosphonium catalyst is represented by the formula

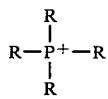

wherein each R is independently a hydrocarbyl or substituted hydrocarbyl group having from about 1 to about 20 carbon atoms at least one of which contains an aromatic ring attached directly to the phosphorus atom.

5. A process of claim 4 wherein said hydrocarbyl groups have from 1 to about 6 carbon atoms and at least two of such R groups contain an aromatic ring attached directly to the phosphorus atom.

6. A process of claim 5 wherein the catalyst is ethyl triphenyl phosphonium trifluoroacetate salt.

7. A process of claims 1, 2 or 3 wherein said catalyst is formed insitu from trifluoroacetic acid or a salt thereof and a phosphonium compound having a halide, carboxylate, dicarboxylate, carboxylate.carboxylic acid complex, phosphate, nitrate, sulfate, nitrite, sulfite, borate or chromate as the anion.

8. A process of claim 7 wherein said catalyst is prepared insitu from trifluoroacetic acid and ethyltriphenyl phosphonium acetate.acetic acid complex salt.

9. A process of claim 4 wherein said catalyst is formed insitu from trifluoroacetic acid or a salt thereof and a phosphonium compound having a halide, carboxylate, dicarboxylate, carboxylate.carboxylic acid complex, phosphate, nitrate, sulfate, nitrite, sulfite, borate or chromate as the anion.

10. A process of claim 9 wherein said catalyst is prepared insitu from trifluoroacetic acid and ethyltriphenyl phosphonium acetate.acetic acid complex salt.

11. A process of claim 5 wherein said catalyst is formed insitu from trifluoroacetic acid or a salt thereof and a phosphonium compound having a halide, carboxylate, dicarboxylate, carboxylate.carboxylic acid complex, phosphate, nitrate, sulfate, nitrite, sulfite, borate or chromate as the anion.

12. A process of claim 11 wherein said catalyst is prepared insitu from trifluoroacetic acid and ethyltriphenyl phosphonium acetate.acetic acid complex salt.

* * * * *